Sept. 11, 1962    D. K. MORRISON    3,053,392
FILTER
Filed Nov. 14, 1957
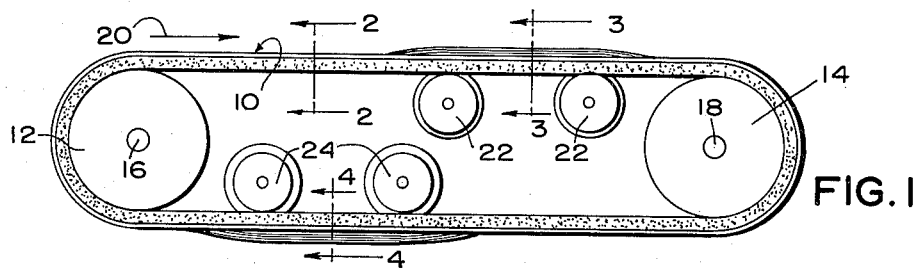
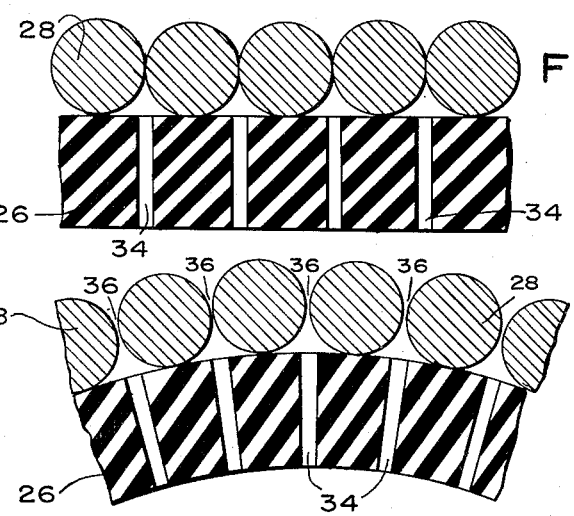
FIG. 2
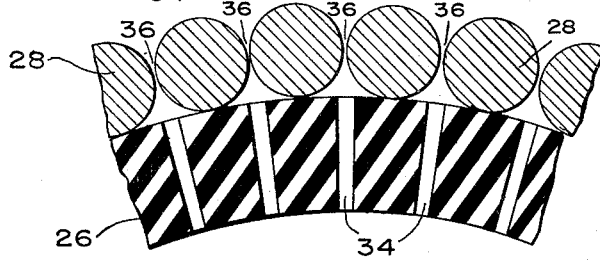
FIG. 3
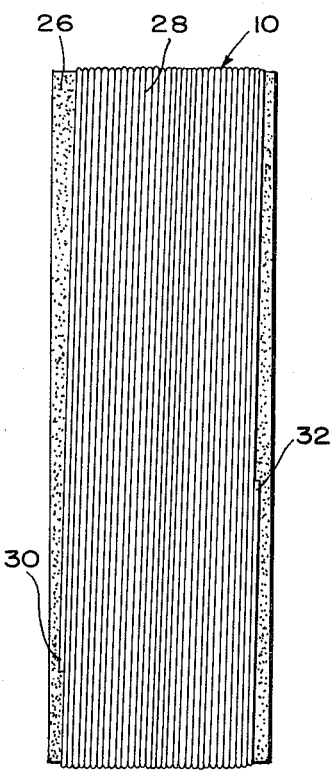
FIG. 6
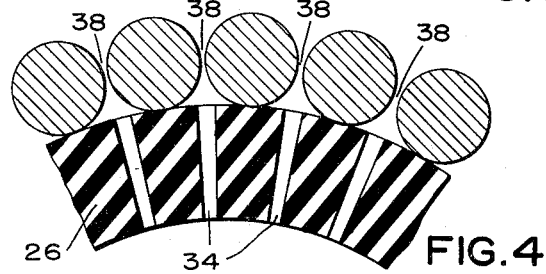
FIG. 4
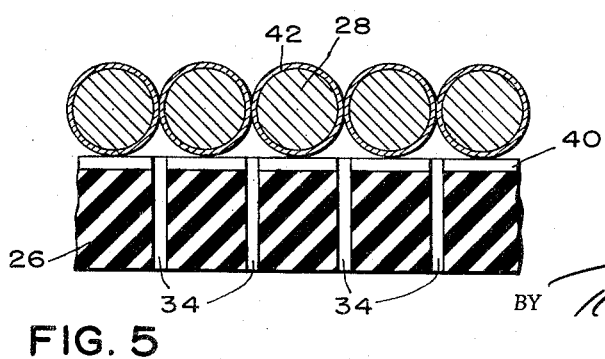
FIG. 5
INVENTOR
DAVID K. MORRISON
BY *Raymond W. Wootton*
ATTORNEY

United States Patent Office 3,053,392
Patented Sept. 11, 1962

3,053,392
FILTER
David K. Morrison, Hollywood, Fla. (% Florida Drafting Service, Bldg. 3, Broward International Airport, Fort Lauderdale, Fla.)
Filed Nov. 14, 1957, Ser. No. 696,430
5 Claims. (Cl. 210—391)

This invention relates to a filter of the belt type and is eminently suited for use with fluids of all types where variation of the size of the particles to be removed can be effected rather readily.

Conventional filters available at moderate prices are completely lacking in adjustability of particle size, they are incapable of removing fine particles, they are subject to wear through use so that the particle sizes filtered will vary throughout the life of the apparatus, and they present difficulty in cleaning.

Filters constituting the subject matter of the present invention have overcome these disadvantages simply and effectively. A filter according to this invention comprises a laterally flexible endless support having a peripheral surface and a filament helically disposed on the surface having a plurality of convolutions, proximate convolutions being preferably in contact under unflexed conditions of the support. The support preferably possesses elastic properties and is fluid pervious. The filament is preferably electrically conductive metal of solid cross section. The filament may be coated prior to its application to the support with a soluble coating which might be removed subsequently or with a permanent coating whose chemical properties are suited to particular uses for which the filter might be intended.

Flexing means engaging the support for a portion of its length is contemplated to modify the spacing of proximate convolutions of the filament. Such flexing means may include spaced arcuate members such as crowned pulleys or rollers, which may be arranged in pairs to impart differing degrees of flexure to the support at a plurality of zones.

A more complete understanding of the invention will follow from a description of the accompanying drawing wherein:

FIG. 1 is a side elevation of a filter embodying the present invention;

FIG. 2 is a fragmentary section on a somewhat enlarged scale taken along line 2—2 of FIG. 1;

FIG. 3 is a fragmentary section along line 3—3 of FIG. 1, on an enlarged scale;

FIG. 4 is a fragmentary section taken along line 4—4 of FIG. 1, on an enlarged scale;

FIG. 5 is a fragmentary section, similar to that of FIG. 2, depicting a modification; and FIG. 6 is a plan view of the filter depicted in FIG. 1.

The filter depicted in FIG. 1 includes an element 10 of the belt type extending between spaced pulleys 12 and 14 carried by shafts 16 and 18 respectively. Either or both of the pulleys 12 and 14 may be driven to impart movement to the filter element 10. Assuming such movement to be in the direction of the arrow 20, a filtering station may occur in a zone disposed between a pair of flexing members 22, shown as crowned pulleys, in engagement with the inner periphery of the filter element 10. The curvature of the periphery of each such crowned pulley will be imparted to the filter element between them, as shown in FIG. 1. Another pair of crowned pulleys 24 have been depicted at a zone spaced from the first, the crown exceeding that provided by the pulleys 22 so that the intermediate portion of the filter element 10 will be deflected even more in this area, as clearly shown in FIG. 1. This zone between the flexing members 24 may constitute a cleaning zone for the filter.

As shown in FIG. 6, the filter element 10 comprises a laterally flexible endless support 26 which may be formed from rubber or belting of other materials on the outer peripheral surface of which a filament 28 is wound helically from one end 30 to its opposite end 32. These ends 30 and 32 as well as such intermediate portions of the filament as may be desired will be secured to the support 26 to maintain the parts in proper assembly. Except for the ends 30 and 32 of the filament however, friction alone may be adequate for this purpose in certain constructions.

The support 26 as depicted in FIG. 2, may be provided with spaced perforations 34 to permit fluids to pass directly through from one surface to the other. As also shown in this figure, the proximate convolutions of the filament 28 are in contact while the support 26 assumes its unflexed condition. Under these circumstances, there will be a minimum passage of fluid between the convolutions. As the support is flexed laterally to a condition depicted in FIG. 3, the proximate convolutions of the filament will become separated to provide gaps 36 through which the filtering function will be achieved. Where the arcuate condition assumed by the support 26 is circular, the gaps 36 will be expected to be uniform. An increase in the curvature of the support 26 as depicted in FIG. 4 will produce gaps 38 of somewhat increased dimension which may be desirable for cleaning the filter as by an air blast directed from within the filter element in the zone defined by the flexing members 24 of FIG. 1.

It will be clear that the gap size between proximate convolutions can be modified by the mere substitution of flexing members having different curvatures.

Prior to the application of the filament 28 to the support 26, the support can be provided with lateral grooves 40 such as depicted in FIG. 5 so that fluids passing through the gaps defined by the convolutions of the filament need not pass completely through the belt to be discharged. Such grooves 40 can be provided in any number and with any desired spacing as well as at different angles to the edge of the support. The filament 28 in this figure is shown as carrying a coating 42 which may serve any one or more of several functions. The coating may be soluble and serve merely for initial spacing of the convolutions so that when it is removed, the convolutions will partake of a predetermined spaced relationship. It may have a chemical property or properties predetermined with respect to the contemplated use of the filter. It may possess electrical conducting properties different from those of the filament itself or it may possess different properties of adsorption or absorption from those of the filament itself.

A variety of materials can be employed for the support including elastomers, reinforced elastomers, metals, plastics, and others. The filaments may be formed of metals such as stainless steel, plastics, and other materials.

Where the support 26 is composed of rubber or rubber bearing materials, or other materials having elastic properties, it will tend to resume its unflexed condition upon removal of flexing forces.

Whereas the invention has been described in only two specific forms, it lends itself to a wide variety of constructions which will suggest themselves to those skilled in the art and which are intended for inclusion in the appended claims.

I claim:

1. A filtering device comprising a pair of spaced pulleys, a flexible endless belt support trained about said pulleys, said belt having inner and outer surfaces and containing spaced perforations, a filament helically disposed throughout its length on said belt and secured to the outer surface thereof and having a plurality of convolutions closely spaced to provide a filtration surface, and means interposed between said pulleys and contacting the inner surface of said belt to flex said belt and filament and thereby control the spacing between adjacent convolutions and thus control the filtering characteristics of said filtration surface.

2. A filtering device as set forth in claim 1 wherein adjacent convolutions of said filament are in contact under unflexed conditions of said belt and filament.

3. A filtering device as set forth in claim 1 wherein said filament is provided with a coating.

4. A filtering device as set forth in claim 3 wherein said coating is water soluble.

5. A filtering device as set forth in claim 1 including further means spaced from the first said means interposed between said pulleys and contacting the inner surface of said belt to flex said belt and filament to a greater degree than the first said means.

References Cited in the file of this patent

UNITED STATES PATENTS

| | | |
|---|---|---|
| 594,415 | Morrison | Nov. 30, 1897 |
| 1,856,452 | Armstrong | May 3, 1932 |
| 2,173,256 | Jordan | Sept. 19, 1939 |
| 2,185,868 | Schaefer | Jan. 2, 1940 |
| 2,247,460 | Wright | July 1, 1941 |
| 2,342,669 | Hoffman | Feb. 29, 1944 |
| 2,426,886 | Komline | Sept. 2, 1947 |
| 2,549,729 | Wallny | Apr. 17, 1951 |
| 2,583,698 | Komline | Jan. 29, 1952 |